United States Patent [19]

Clabburn et al.

[11] 4,431,861
[45] Feb. 14, 1984

[54] HEAT RECOVERABLE ARTICLE FOR HIGH VOLTAGE CABLE TERMINATIONS AND SPLICES AND METHOD FOR MAKING TERMINATION AND SPLICES USING SAME

[75] Inventors: Robin J. T. Clabburn, Menlo Park, Calif.; Richard J. Penneck, Lechlade, England

[73] Assignee: Raychem Limited, London, England

[21] Appl. No.: 180,901

[22] Filed: Aug. 25, 1980

Related U.S. Application Data

[63] Continuation-in-part of Ser. No. 126,524, Mar. 3, 1980, abandoned, which is a continuation of Ser. No. 618,358, Oct. 1, 1975, abandoned.

[30] Foreign Application Priority Data

Oct. 8, 1974 [GB] United Kingdom ............... 43613/74

[51] Int. Cl.³ ................. H02G 15/064; H02G 15/184; H01B 1/24; H01B 5/14
[52] U.S. Cl. .................... 174/73 R; 29/859; 156/86; 174/DIG. 1; 174/DIG. 8; 428/36
[58] Field of Search ................. 174/73 R, 73 SC, 127, 174/DIG. 1, DIG. 8; 29/858, 859; 156/49, 84, 85, 86; 428/36

[56] References Cited

U.S. PATENT DOCUMENTS

| | | | |
|---|---|---|---|
| 3,035,113 | 5/1962 | Danchuk | 174/DIG. 8 X |
| 3,210,460 | 10/1965 | Suelmann | 174/73 R |
| 3,317,655 | 5/1967 | Oatess et al. | 174/73 R |
| 3,624,594 | 11/1971 | Trimble et al. | 174/DIG. 8 X |
| 3,950,604 | 4/1976 | Penneck | 174/73 R X |

FOREIGN PATENT DOCUMENTS

| | | | |
|---|---|---|---|
| 97340 | 5/1973 | Fed. Rep. of Germany . | |
| 2263909 | 10/1973 | Fed. Rep. of Germany | 174/73 R |
| 2344052 | 4/1974 | Fed. Rep. of Germany . | |
| 2345326 | 5/1974 | Fed. Rep. of Germany . | |
| 2440327 | 3/1975 | Fed. Rep. of Germany . | |
| 2180474 | 11/1973 | France . | |
| 2197725 | 3/1974 | France . | |
| 1337951 | 11/1973 | United Kingdom | 174/73 R |
| 1431167 | 4/1976 | United Kingdom . | |
| 1434719 | 5/1976 | United Kingdom | 174/73 R |
| 1470501 | 4/1977 | United Kingdom | 174/73 R |
| 1484261 | 9/1977 | United Kingdom . | |

*Primary Examiner*—Laramie E. Askin
*Attorney, Agent, or Firm*—Lyon & Lyon

[57] ABSTRACT

Terminations and splices in high voltage electrical cable can be shielded by shrinking over the termination or splice a heat recoverable hollow article which comprises a heat-shrinkable outer sleeve whose outer surface is anti-tracking at voltages of 2.5 KV and at least part of whose inner surface has a layer thereon which is solid at room temperature and which has electrical stress-grading character.

30 Claims, 2 Drawing Figures

HEAT RECOVERABLE ARTICLE FOR HIGH VOLTAGE CABLE TERMINATIONS AND SPLICES AND METHOD FOR MAKING TERMINATION AND SPLICES USING SAME

CROSS-REFERENCE TO RELATED APPLICATIONS

This application is a continuation-in-part of our co-pending application Ser. No. 126,524, filed Mar. 3, 1980, now abandoned, which is itself a continuation of our application Ser. No. 618,358, filed Oct. 1, 1975, now abandoned. The disclosures of those applications are incorporated herein by reference.

FIELD OF THE INVENTION

This invention relates to heat recoverable products, more especially to heat-shrinkable products, and to such products for use in conjunction with electric circuits carrying high voltage, for example power lines or cables, transformers or switchgear, especially for use as termination systems for high voltage carrying cables.

BACKGROUND OF THE INVENTION

In a continuously shielded or screened high voltage cable, the electric field is uniform along the cable axis, and there is variation in the field only in the radial direction. The spacing of the electric flux lines and the equipotential lines is closer in the region of the conductor than elsewhere, as shown by the following equation:

$$E_x = \frac{V_o}{x \ln (R/r)}$$

where $E_x$ = electrical stress at point x, in volts/mil
x = distance from centre of cable in mils
$V_o$ = applied voltage in volts
R = radius of cable over insulation
r = radius of cable conductor Thus the stress is a function of the geometry of the cable and in practice the insulation thickness is sufficient to maintain the stresses at acceptable levels for the dielectric concerned. The stress is determined such that the cable will operate continuously at normal working voltages and that the discharge level is acceptably low.

When such a cable is terminated or spliced, the screen or shield is removed for a distance determined by the termination or splicing method. The removal of the screen or shield causes a discontinuity of the electrical field at the screen or shield end, resulting in a high electrical stress. For successful use, the high stress caused here must be reduced to about the maximum level within the cable itself in order not to impair the expected life of the system.

In order to relieve this stress, and prevent failure of the cable and termination or splice in service, a number of methods have been developed to provide adequate stress control. Among these methods may be mentioned the use of stress cones (pre-moulded or fabricated type), resistive coatings and nonlinear tapes.

Stress cones extend the shield or screen of the cable by the use of a conducting material such as wire, metal foil or tapes on part of the surface of an insulating cone. The cone may be made from tapes of plastic or paper, epoxy resins, rubbers etc. Stress cones thus increase the diameter of the cable at the discontinuity and hence reduce the stress. However, their application is labor intensive in that they require considerable skill and time during fabrication on the cable.

Pre-moulded stress cones of the slip-over type may also be used. These require interference fits, which in practice means that both cable and cone have to be made to close tolerance for optimum performance. It has also been proposed to make stress cones by the build up of layers of different lengths of heat shrinkable tubing, but such cones are not very practical as this method is very time consuming and introduces the possibility of interlaminar voids.

Resistive coatings on the surface of the insulation from the conductor to the shield will reduce the stress by conducting sufficient current to establish a substantially linear distribution of voltage. The high resistance necessary to achieve this and to avoid dissipating an excessive amount of power is rather critical and must remain a constant value in service in order to be satisfactory. This is very difficult to achieve in practice and such coatings are not now in general use.

Coverings of preformed sleeves, wrapped tapes such as those based on PVC, or lacquer or varnish coatings, having a non-linear electrical characteristic, have also been proposed to provide stress control. These coverings have the disadvantage that, in general, effective stress control is obtained only by careful and skillful application of the covering and that the materials of the covering deteriorate rapidly at elevated temperatures, by thermal degradation, or by differential thermal expansion between the dielectric and the stress control layer.

It has also been proposed to effect stress control by use of heat shrinkable polymeric articles which have dispersed therein materials giving nonlinear electric impedance characteristics. See, for example, British Pat. Nos. 1,470,501; 1,470,502; 1,470,503 and 1,470,504 and corresponding U.S. application to Penneck and Taylor, Ser. No. 453,165 filed Mar. 20, 1974, abandoned in favor of continuation application Ser. No. 671,343 filed Mar. 29, 1976, abandoned in favor of continuation application Ser. No. 904,736 filed May 11, 1978, the disclosures of which are incorporated by reference. The stress control means may take the form of a heat-shrinkable sleeve which is applied to the portion of the stripped cable which extends from the screen for a pre-determined distance over the cable dielectric. It has further been proposed, for example, in German OLS No. 22 63 909, to apply a layer of a semiconductive paste to the inner surface of a heat-shrinkable sleeve. The sleeve is placed over the stripped cable and heated to force the paste into contact with the cable.

It is advantageous that terminations of high voltage cables for indoor use, and very important that those for outdoor use, are protected against moisture and pollutants, if these are present in the surrounding atmosphere. Such protection may take the form of taping or a sleeve of a material in which, if it is at least partly organic in nature, there may be dispersed an anti-tracking filler, for example hydrated alumina. The anti-tracking filler tends to prevent the formation, on the outer surface of the materials, of carbonaceous, electrically conducting deposits.

It is proposed in British Pat. Nos. 1,337,951, 1,284,082 and 1,303,432 that such protection may be in the form of a heat-shrinkable sleeve of a polymeric material having dispersed therein an anti-tracking filler system.

There are in general use two types of power cable, one comprises oil impregnated papers, wherein paper insulation is applied by helically winding many layers of tape over the conductor, followed by extrusion of a seamless lead or aluminum jacket to provide earth continuity and screening, as well as a moisture barrier and mechanical protection; the assembly is then vacuum dried and impregnated. The second has a polymeric dielectric for example polyvinylchloride, polyethylene which may be cross-linked, or ethylene-propylene rubber. These materials are extruded onto the conductor and where required cross-linked subsequently.

In terminating a high voltage cable by means of heat-shrinkable products, it is necessary in the case of an oil-impregnated paper cable to shrink an insulating heat shrinkable sleeve over the papers. A length of stress grading heat-shrinkable tubing is shrunk in place over the end of the shield to extend for some distance over the dielectric or heat-recovered insulating sleeve, sealant is placed on the uncovered portion of the shield and on the uncovered end of the dielectric or insulating heat-recovered sleeve and a protective heat-shrinkable sleeve of anti-tracking material is recovered over the entire stripped portion of the cable. For outdoor use a number of sheds must be provided on the anti-tracking layer or the anti-tracking heat shrinkable sleeve may be provided with integral sheds as described in British Pat. No. 1,530,994 and U.S. Pat. No. 4,045,604. The disclosures of these are incorporated by reference.

Such terminations have been found to be very satisfactory but although they are considerably time-saving over traditional methods as well as having other advantages, they do involve several separate parts, each of which has to be applied in turn to the cable. This process is time consuming and, if a number of components is used, which is often the case, the process is open to operator error. Clearly, the more operations involved, the more errors are likely to arise. From the foregoing, it can be seen that prior art methods for terminating or splicing high voltage cable are not wholly satisfactory.

SUMMARY OF THE INVENTION

The present invention provides a heat-shrinkable hollow article for use in terminating or splicing a high voltage cable comprising an outer sleeve, the outer surface of which has an initial tracking voltage, as hereinafter defined, of at least 2.5 KV, and a solid layer which has stress grading electrical characteristics on at least a portion of the inner surface, the sleeve being formed of a material to which the property of independent dimensional heat instability, as hereinafter defined, has been imparted, the heat-shrinkability of the article being substantially solely due to said independent dimensional heat instability. The use of a solid layer to provide stress-grading characteristics provides substantial advantages over the use of pastes such as those proposed for use in German OLS NO. 22 63 909, which can readily be wiped off during installation and/or subsequently displaced.

The present invention further provides a method of terminating or splicing a high voltage cable wherein the exposed lengths of the screen, the dielectric and the conductor(s) are protected by shrinking a heat-shrinkable article according to the invention thereover.

The present invention furthermore provides a high voltage cable which has been spliced or terminated by means of a heat-shrinkable, hollow article according to the invention.

DETAILED DESCRIPTION OF THE INVENTION

Figure 1:
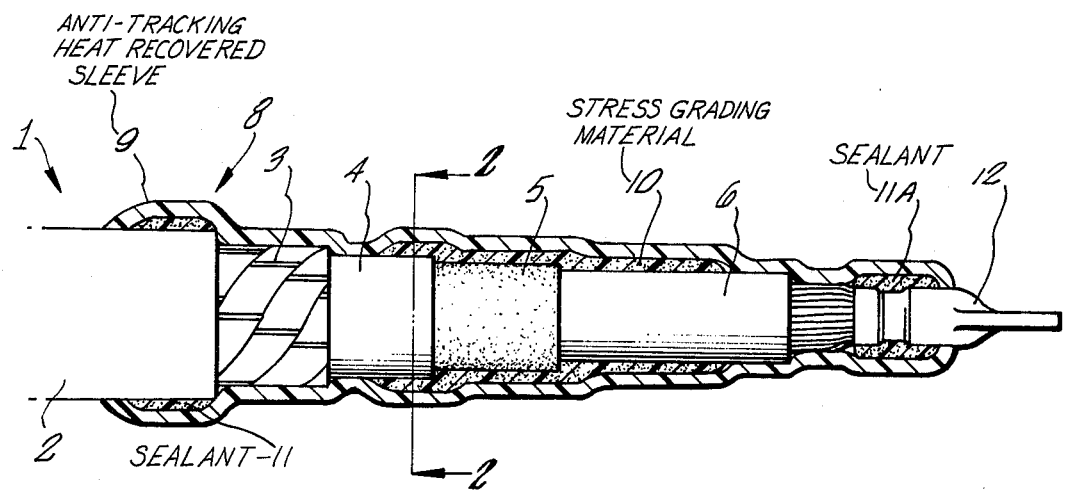
FIG. 1 illustrates a longitudinal sectional view of a high voltage cable terminated by means of an article according to the present invention.
Figure 2:
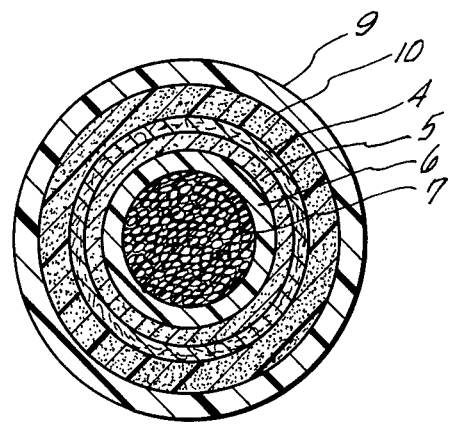
FIG. 2 is a cross-sectional view taken along line 2—2 of FIG. 1.

By the term "heat shrinkable article" there is meant an article which has been expanded under heat and/or pressure from an original configuration to a dimensionally heat-unstable configuration and which has been caused to remain in said heat-unstable configuration, for example by cooling while maintaining the pressure, the article being capable of returning to or towards its original configuration upon the application of heat alone. The temperature or temperature range over which recovery occurs for crystalline polymers will be at or about the crystalline melting point or range for the polymer.

By the term "independent dimensional heat instability" there is meant the property of a homogeneous portion of an article which causes that portion of the article, independently of forces exerted by other portions of the article, on heating, to alter or attempt to alter its dimensions to those which are stable to heat. The term "homogeneous" is used herein to indicate the portion is monolithic and to distinguish the portion referred to from, for example, a laminate, that is, it is used on "macro" rather than on a "micro" scale.

The initial tracking voltage is measured by the inclined plane test of Mathes and McGowan according to the American Society for Testing and Materials (ASTM) D2303. In this test, a sample of the material is mounted at 45° to the horizontal with two electrodes attached to its underside, 50 mm apart. Contaminant in the form of a solution of ammonium chloride, having a volume resistivity of 380 ohm×cm and containing the wetting agent Triton X100, flows at a controlled rate from the upper to the lower electrode. The test is typically commenced at 1.5 KV and the voltage is increased at 0.25 KV per hour until failure occurs.

The outer surface of the heat shrinkable hollow article according to the present invention has an initial tracking voltage (measured in accordance with the ASTM D2303) of at least about 2.5 KV, and preferably 3.5 KV or greater. For the termination of a high voltage power cable, the outer surface of the heat-shrinkable hollow article according to the present invention is preferably non-tracking. By "non-tracking" there is meant that characteristic of a material which results in resistance of a material to the formation of dendritic, carbonaceous, electrically conducting deposits on the material surface under the influence of high electrical voltages.

Materials for use in the article of the present invention having an initial tracking voltage of at least 2.5 KV comprise at least one or more polymeric materials into which an anti-tracking system may be incorporated if necessary. Amongst the suitable polymeric materials there may be mentioned polyolefins and other olefin polymers obtained from two or more monomers, especially terpolymers; polyacrylates; and silicone polymers. Particularly suitable polymers include polyethylene, ethylene/acrylate copolymers, especially ethylene/methyl acrylate copolymers and ethylene/ethyl acrylate copolymers, ethylene/methacrylate copolymers, especially ethylene/methyl methacrylate copolymers and ethylene/ethyl methacrylate copolymers, ethylene/vinyl acetate copolymers, ethylene/propylene copolymers, ethylene/propylene/-non-conjugated-diene terpolymers, chlorosulphonated polyethylene, polypropylene, polydimethyl siloxane, dimethyl siloxane/methyl vinyl siloxane copolymers, carborane siloxanes, e.g. "Dexsil" polymers made by Olin Mathieson, the modified elastomer disclosed in British Pat. No. 1,010,064, polybutyl acrylate, butylethyl acrylate copolymers, butyl acrylate/glycidyl methacrylate copolymers, poly-butene, butyl rubbers, ionomeric polymers, e.g. "Surlyn" materials made by Du Pont, substantially mono alkyl silicones especially those having a carbon/silicon ratio of 1.5:1 to 1:1, especially substantially monomethyl silicones, substantially mono alkyl-silicones in dimethyl silicones or mixtures of any two or more of the above. The method in which such polymers are rendered heat recoverable is now well known in the art and the details of this method will not be repeated here. Reference can be made to the prior art, for example, Cook U.S. Pat. No. 3,086,242, which is incorporated herein by reference, for a suitable procedure.

For the anti-tracking system there may be mentioned hydrated alumina, especially those systems disclosed in British Pat. No. 1,041,503, especially alumina trihydrate, one or more of the alkaline earth sulphates according to British Pat. No. 1,240,403 and the anti-tracking materials of British Pat. No. 1,337,951 and corresponding U.S. application of Penneck, Ser. No. 81,558 filed Oct. 16, 1970, abandoned in favor or continuation application Ser. No. 434,126 filed Jan. 17, 1974, abandoned in favor of continuation application Ser. No. 109,249 filed Jan. 3, 1980, now abandoned, each of which may be incorporated into the polymeric material either alone or in a blend with one or more other anti-tracking systems. The disclosures of these are incorporated by reference. For especially suitable materials having tracking characteristics according to the present invention there may be mentioned the composition disclosed in British Pat. No. 1,337,951 and the corresponding U.S. application referred to above but any material having the required anti-tracking characteristics may be understood to be suitable for an article according to the present invention. This particularly preferred composition comprises a mixture of a hydrate of alumina having a specific surface area of at least 2 $m^2/g$, measured by the BET method, and a compound from the group consisting of oxides, mixed oxides and mixtures of oxides wherein said compound contains at least one element from the transition elements, the lanthanide series or the non-transuranic actinide series.

By a "transition element" there is herein meant the elements of sub-groups IVa, Va, VIa, VIIa, and Group VIII of the Mendeleef periodic table which are not also in the nontransuranic actinide series, e.g., titanium, zirconium, and hafnium; vanadium, niobium, and tantalum; chromium, molybdenum and tungsten; manganese, technetium, and rhenium; and iron, cobalt, nickel, ruthenium, rhodium, palladium, osmium, iridium and platinum.

By "lanthanide series" there is herein meant the elements cerium, praseodymium, neodymium, promethium, samarium, europium, gadolinium, terbium, dysprosium, holmium, erbium, thulium, ytterbium and lutetium.

By "nontransuranic actinide series" there is herein meant the elements thorium, protactinium, and uranium.

Among oxides, mixed oxides and mixtures suitable there may be mentioned, for example,
  (i) Transition metal oxides, for example, $TiO_2$, $V_2O_5$, $Cr_2O_3$, $NiO_2$, $Ni_3O_4$, $Co_2O_3$, $Co_3O_4$, $MoO_3$, $WO_3$, $Nb_2O_5$, and mixtures thereof.
  (ii) Lanthanide series oxides, for example, $Pr_6O_{11}$, $Yb_2O_3$, $Ce_2O_3$, holmium oxide, erbium oxide, and mixtures thereof.
  (iii) Nontransuranic actinide series oxides, for example, $UO_3$, $ThO_2$ and mixtures thereof.
  (iv) Mixed oxides containing one or more transition metals, for example, nickel titanate, nickel molybdate and cobalt silicate.
  (v) Any of the above oxides, mixed oxides or mixtures carried on an ahydrous alumina support, e.g., nickel cobalt molybdate on alumina and cobalt oxide on alumina CoO. $Al_2O_3$ (blue cobalt aluminate).
  (vi) Any of the above systems doped with small quantities of alkali metal or alkaline earth metal oxides, especially $Li_2O$ and $K_2O$.

It is understood that the above listing is illustrative only, and is not intended to be a complete list of all the oxides which are operable in the invention.

The oxide component, which is believed to react synergistically with the alumina hydrate in reducing tracking, may in some cases be used in quantities down to or below 0.5% by weight based on the total weight of the insulation material, but in general is preferably present in an amount in the range of from 2 to 10%, especially from 3 to 5%. Although amounts higher than 10% may be employed, little additional benefit to the tracking and erosion properties is gained thereby with most oxides. However, with some oxides of the invention e.g., $ThO_2$, the oxide is preferably present in quantities of about 15% or more by weight.

The layer on the inner surface of the heat shrinkable hollow article has stress grading electrical impedance characteristics, which may be linear or, preferably, nonlinear in nature. These may be resistive, capacitive, or a combination thereof and the resistive component may be linear or nonlinear. By the term "linear electrically resistive material" there is meant a material which upon the application of a voltage obeys Ohm's Law. By the term "non-linear electrically resistive material" there is meant a material, the electrical resistance of which varies with the voltage applied, that is, the current I flowing through the material when a voltage V is applied across the material substantially obeys the relationship: $I=KV^\gamma$ wherein K is a constant, and $\gamma$ is a constant, greater or less than 1. Preferably, $\gamma$ is at least 1.5 at some direct current stress between 0.01 KV/mm and 10 KV/mm, advantageously at least 1.5 at a stress below 5 KV/mm.

The heat-shrinkable hollow article comprises a polymeric heat-shrinkable outer sleeve of one of the aforementioned polymer systems having an initial tracking voltage of at least 2.5 KV, preferably being non-tracking, and a layer, which is solid at room temperature, on at least a portion of the inner surface of said outer sleeve, at least the inner surface of said layer having stress grading, preferably non-linear, electrical impedance characteristics.

Layers having stress grading electrical characteristics may comprise a base of, for example, a polymeric material, mastic, paint or varnish, admixed with a compound having stress grading electrical properties provided that the layer does not interfere in any substantial way with recovery of the outer sleeve from its heat-unstable to its heat-stable configuration.

The layer may be applied to the inner surface of the outer sleeve by any known method, for example, moulding, extrusion, painting or spreading. The layer may be applied in the form of a solution, the layer adhering to the inner surface of the outer sleeve upon evaporation of the solvent. Where the layer is, for example, a polymeric material, it may be extruded as a tube and placed inside and advantageously adhered to the outer sleeve such that on heat-shrinking of the article, the layer will be forced into intimate contact with the directly overlying portion of the inner surface of the outer sleeve. The tube may be adhered to the portion of the outer sleeve to form the article of the invention and the article may be subsequently rendered heat-shrinkable.

The material forming the base of the layer in which a compound giving stress grading electrical characteristics can be incorporated is advantageously polymeric and may be selected from a large range of polymers, of any molecular weight. Blends of two or more polymers, into which there may be incorporated conventional additives, may be desired and the materials forming the base will be selected depending to a certain extent on the form of the coating. Examples of polymers suitable either alone or in blends are as follows: Polyolefins, including copolymers of ethylene with propylene, butene, methyl acrylate, ethyl acrylate, methyl methacrylate, ethyl methacrylate, vinyl acetate, vinyl chloride, vinyl propionate, carbon monoxide, maleate, fumarate and itaconic esters, terpolymers of ethylene, vinyl acetate and olefinically unsaturated monocarboxylic acids, for example acrylic or methacrylic acids; the partially neutralized varieties of polymers comprising acid groups, for example ionomeric resins, which generally are the ammonium or alkali or alkaline earth metal derivatives; polyvinyl chloride, vinyl chloride copolymers containing as comonomer vinyl acetate, vinylidene fluoride, dialkyl maleate, or fumarate; fluoro carbon plastics or rubbers including polyvinylidene fluoride, copolymers of vinylidene fluoride and hexafluoropropylene, terpolymers of vinylidene fluoride, hexafluoropropylene and tetrafluoroethylene, copolymers of vinylidene fluoride and 1-hydropentafluoro propene or a terpolymer containing these monomers plus tetrafluoroethylene; nitrile rubbers, acrylate rubbers, and polysulphide rubbers; natural rubbers, synthetic rubbers such as butyl, neoprene, ethylene propylene rubber and the ethylene propylene non conjugated diene terpolymers, silicone rubbers, including those derived from dimethyl siloxane, methylphenyl siloxane, or methyl phenyl vinyl siloxane; these rubbers preferably being "gum form"; also "gum" polyesters, "gum" polyamides and other polymers or copolymers in "gum" form.

For compounds having stress grading electrical characteristics which may be incorporated in the base comprising, for example, a blend of two or more of the above-mentioned materials together with any number of conventional fillers, for example, processing aids, plasticizers, stabilizers, antioxidants, coupling agents, further modified or unmodified fillers and/or cure systems, there may be mentioned, for example, carbon black or silicon carbide particles, flakey metals, for example those described in U.S. Pat. No. 3,349,164, and the materials of British Pat. Nos. 1,470,501; 1,470,502; 1,470,503 and 1,470,504 and corresponding United States application Ser. No. 453,165 filed Mar. 20, 1974, abandoned in favor of continuation application Ser. No. 671,343, filed Mar. 29, 1976, abandoned in favor of continuation application Ser. No. 904,736, filed May 11, 1978, the disclosures of which are incorporated by reference. One or more of these compounds having stress grading electrical characteristics may be blended into the base material of the layer.

Among useful stress grading compositions may be mentioned particulate compounds selected from the group consisting of:
  (i) Compounds having a perovskite type crystal structure.
  (ii) Compounds having a spinel crystal structure other than $\gamma$-$Fe_2O_3$ and spinel itself.
  (iii) Compounds having an inverse spinel crystal structure.
  (iv) Compounds having a mixed spinel crystal structure.
  (v) Dichalcogenides of transition metals.
  (vi) Ferro-electrical materials such as AgI, Prussian Blue, Rochelle salt and related tartrates, compounds of the formula $XH_2YO_4$ wherein X is K, Rb or Cs and Y is P or As, for example potassium dihydrogen phosphate, $(NH_4)_2SO_4$, ammonium fluoroberyllate, thiourea and triglycene sulphate.
  (vii) $Si_3N_4$.

The said particulate compound can be present in an amount of at least 10% by weight based on the polymer, and in an amount such that the value of $\gamma$ at some stress between 0.01 KV/mm and 10 KV/mm is at least 1.5. Preferably the value of $\gamma$ is at least 1.5 at a stress below 5 KV/mm.

In addition to the materials listed in (i) to (vii) above, the material may comprise one or more particulate electrically conductive fillers.

As compounds of the type (i) above, there may be mentioned, for example, compounds having the general formulae:
  (a) $ABO_3$ wherein A represents Ca, Sr, Ba, Pb, Mg, Zn, Ni or Cd and B represents Ti, Zr, Hf, Sn, Ce or Tc or A represents a rare earth metal and B represents Al, Se, V, Cr, Mn, Fe, Co or Ga,
  (b) $KBF_3$ wherein B represents Mg, Cr, Mn, Fe, Co, Ni, Cu or Zn, or
  (c) $ATiS_3$ wherein A represents Sr or Ba, and $AZrS_3$ wherein A represents Ca, Sr, Ba.

There may be especially mentioned $BaTiO_3$, $BaSrO_3$ and $TnTiO_3$ and the following, which are preferably used in admixture with a particulate conductive filler: $BaZrO_3$, $CaTiO_3$, $CaSnO_3$, $CaZrO_3$, $PbSnO_3$, $MgZrO_3$, $NiTiO_3$ and mixed zinc titanate.

As compounds of the type (ii) there may be mentioned, for example, compounds having the general formula:
  (d) $A''B_2'''O_4$ wherein A represents Hg, Mn, Fe, Co, Ni, Cu, Zn or Cd etc. and B represents Al, Cr, Fe, Mn, Co or V, provided that when A represents Hg, B cannot represent Al, or
  (e) $A''B''_2O_4$ wherein A represents Ti or Sn and B represents Zn or Co, Ni, Mn, Cr, Cd.

There may be especially mentioned $CoAl_2O_4$, $CuCr_2O_4$, $CuMnO_4$, $CuFe_2O_4$, $ZnFe_2O_4$. Barium and strontium ferrites (e.g. $BaFe_{12}O_{19}$) which are of the magnetoplumbite structure (a type of depleted spinel) are also suitable.

As compounds of the type (iii) there may be mentioned, for example, (f) $Fe'''(Mg''Fe''')O_4$, $Fe'''(Ni''Fe''')O_4$, $Fe'''(Cr''Fe'')O_4$, $Co''(Co''Sn)O_4$, $Zn''(Zn''Ti)O_4$, $Zn''(Zn''Sn)O_4$, $Li_2V_2O_4$, $Fe_{2.5}Li_{0.5}O$ and, especially, $Mn_3O_4$, $Co_3O_4$, $Fe_3O_4$ and slightly non-stoichiometric variants thereof, for example $Fe_2O_3.0.8FeO$.

As compounds of the type (iv) there may be mentioned, for example, Bayer Fast Black 100 (which results from sintering 50% by weight $Co_2O_3$, 40% by weight $Fe_2O_3$ and 10% by weight CuO), Bayer 303T (a mixed phase pigment of about $\frac{2}{3}$ $Fe_2O_3$ and $\frac{1}{3}$ MnO), Harrison Meyer Black (an Fe-Co-Ni mixed oxide) and Columbian Mapico Black (a synthetic magnetite of about 22% FeO and 77% $Fe_2O_3$).

As compounds of the type (v) there may be especially mentioned, for example, $MoS_2$, $MoSe_2$, $MoTe_2$, $WS_2$, $MnO_2$, $FeS_2$, $SnO_2$, and $CrO_2$.

$Si_3N_4$ and $CoAl_2O_4$ mentioned above are preferably used in admixture with a particulate, conductive filler.

As conductive particulate fillers there may be mentioned, for example, carbon blacks, metallic powders, for example aluminum, chromium, copper, bronze, brass, iron, stainless steel, lead, silver, manganese, zinc, Ni/Al and nickel powders, and particulate platinized- or palladized-asbestos, -silica, -alumina, and -charcoal.

The compounds may also be used in admixture with silicon carbide particles.

The proportion of particulate compounds and fillers may be widely varied, depending on (a) the electrical properties required of the material, (b) the chemical nature of the polymer. The desired proportion may be determined relatively simply by experimentation. In general, the particulate compounds will be present to at least 10% by weight of the polymer and more particularly the weight ratio of particulate compound to polymer will be within the range of from 10 to 500:100. The conductive particulate filler will generally be used in a concentration up to a maximum of 40 parts in the case of carbon black and of 100 parts in the case of metal powders relative to 100 parts by weight of polymer particularly when gamma is greater than one. Typical values for the conductive particulate filler are in the region 10–25 parts (carbon black) and 50 to 100 (metal powder) per 100 parts of polymer.

The particle sizes of the particulate compounds are preferably below about $20\mu$, more preferably below about $5\mu$. Generally the smaller the particle size the better are the physical properties of the article.

Preferably a sealant is placed on at least a portion of the inner surface of the outer heat-shrinkable sleeve on an area where there is no inner stress grading layer.

Of suitable sealants there may be mentioned hot melt adhesives, mastics and thremosetting adhesives. The composition of the sealant may depend on the nature of the substrates between which sealing against, for example, moisture ingress is desired. Of suitable sealants for, for example, bonding the heat-shrinkable outer sleeve to the exposed cable jacket and/or to the metal lug attached to the center conductor(s) there may be mentioned, for example, the adhesives of British Pat. No. 1,425,575 and corresponding U.S. Pat. No. 3,983,070 or those of British Pat. No. 1,411,943 and corresponding U.S. Pat. No. 4,001,065. The disclosures of these are incorporated by reference.

EXAMPLE 1

A 20 KV cable having a cross-linked polyethylene insulation was stripped to expose 7.5 cm of the conductors, 43 cm of the dielectric, 1 cm of the graphite layer, 1 cm of the paper layer and 2 cm of the copper screen. A lug was crimped onto the conductors.

A stress grading mastic containing 150 g of iron oxide, $Fe_3O_4$ (BX 5099 made by Pfizer Ltd), 50 g butyl rubber (Butyl 065, made by Esso Petroleum Ltd.) and 50 g of polyisobutylene (Vistanex OMMS, made by Esso Petroleum Ltd.) was mixed and coated onto a 25 cm portion 6 cm from the end of a 56 cm length of a heat-shrinkable, non-tracking sleeve by means of a ram extruder having a mushroom-shaped die-head. A mastic containing butyl rubber, as above, and polyisobutylene, as above, was mixed and internally coated onto a 4 cm portion of each end of the heat-shrinkable, non-tracking sleeve. The heat-shrinkable non-tracking sleeve manufactured according to Example 1 of British Pat. No. 1,337,951 was heat-recovered to cover 2 cm of the cable jacket and the stripped portion of the cable.

The cable was tested to give the discharging inception voltage of 5 pc at 50 KV on an ERA Mark III Discharge Detector. According to British Standards BS 923 (1972) the impulse withstand voltage was measured with positive and negative polarity giving 115 KV and the impulse flashover voltage was measured with positive polarity to give 120 to 125 KV.

EXAMPLE 2

A second cable was terminated using the same procedure except that the stress grading mastic comprised low density ethylene propylene rubber and silicon carbide particles. Similar electrical results were obtained.

The present invention also provides an article in which the independent dimensionally heat unstable portion of the article is replaced by a dimensionally unstable portion that is restrained by a further portion which is removable, the removal allowing the dimensionally unstable portion to return to a dimensionally stable state. The further portion may be for example a spirally wound plastic or metal spring or tape, which may be inside or outside the article.

Referring now the drawings, FIG. 1 illustrates a stripped high voltage cable denoted generally by 1. The cable is stripped to show its components which comprise a jacket 2, a copper screen 3, a paper layer 4, a graphite layer 5, a plastic dielectric 6, and conductors 7. A lug 12 has been crimped onto the conductors 7. An article denoted generally by the numeral 8, according to the invention, has been heat-recovered onto the stripped portion of the cable from the jacket 2 to the cable lug 12. The article 8 comprises an outer sleeve 9, having an initial tracking voltage as hereinbefore defined of at least 2.5 KV, an inner coating 10 of a material having nonlinear electrical resistance properties, and sealing means 11 and 11A.

We claim:

1. A hollow recoverable article, which can be recovered by heating and which is useful in making splices and terminations in a high voltage electrical cable, comprising:
   (a) a monolithic heat-shrinkable polymeric sleeve containing an anti-tracking system, the outer surface of said sleeve providing the outer surface of said article and having an initial tracking voltage (as measured by ASTM D2303) of at least 2.5 KV, and (b) adhered to at least a portion of the inner surface of said sleeve, a layer which provides at least a part of the inner surface of said article, which is solid at room temperature and exhibits stress grading electrical impedance character, and which does not interfere in any substantial way with recovery of the sleeve;

the recoverability of said article being substantially solely provided by said sleeve.

2. A recoverable article according to claim 1 wherein said stress grading electrical impedance character is resistive, capacitive or a combination thereof.

3. A recoverable article according to claim 2 wherein any resistive stress grading electrical impedance character present is non-linear.

4. A recoverable article according to claim 3 wherein the layer on the inner surface of the sleeve comprises a material the electrical resistance of which varies with the voltage V applied across the material and the current I flowing through the material at voltage V substantially obeys the relationship $I = KV^\gamma$ wherein K is a constant and $\gamma$ is a constant greater than 1.

5. A recoverable article according to claim 4 wherein $\gamma$ is at least 1.5 at a direct current stress between 0.01 KV/mm and 10 KV/mm.

6. A recoverable article according to claim 5 wherein $\gamma$ is at least 1.5 at a stress below 5 KV/mm.

7. A recoverable article according to claim 1 wherein the outer surface has an initial tracking voltage of at least 3.5 KV.

8. A recoverable article according to claim 1 wherein the outer surface is non-tracking.

9. A recoverable article according to claim 1 wherein the layer comprises a particulate electrically conductive filler dispersed in a polymer to the extent of at least 10 parts by weight per 100 parts by weight of the polymer.

10. A recoverable article according to claim 9 wherein the layer comprises carbon black.

11. A recoverable article according to claim 1 wherein said layer covers the entire inner surface of said sleeve.

12. A recoverable article according to claim 1 wherein the inner surface of said sleeve is coated at its ends with a sealant and intermediate its ends with said layer of stress grading electrical impedance character.

13. A recoverable article according to claim 12 wherein the sealant and stress grading layer together cover the entire inner surface of the sleeve.

14. In the method of making a splice or termination in high voltage electrical cable wherein a portion of the covering about the conductor element is removed to bare the conductor and a termination or splice is made thereto, the improvement comprising:

(a) disposing about the area from which the covering has been removed a hollow recoverable article which can be recovered by heating comprising a monolithic heat-shrinkable polymeric sleeve containing an anti-tracking system, the outer surface of said sleeve providing the outer surface of said article and having an initial tracking voltage (as measured by ASTM D2303) of at least 2.5 KV, and, adhered to at least a portion of the inner surface of said sleeve, a layer which provides at least a part of the inner surface of said article, which is solid at room temperature and exhibits stress grading electrical impedance character, and which does not interere in any substantial way with recovery of the sleeve, the recoverability of said article being substantially solely provided by said sleeve; and (b) heating said article to cause the shrinkage of said sleeve about the area to be covered.

15. A method according to claim 14 wherein said stress grading electrical impedance character is resistive, capacitive or a combination thereof.

16. A method according to claim 15 wherein any resistive stress grading electrical impedance character present is non-linear.

17. A method according to claim 16 wherein the layer on the inner surface of the sleeve comprises a material the electrical resistance of which varies with the voltage V applied across the material and the current I flowing through the material at voltage V substantially obeys the relationship $I = KV^\gamma$ wherein K is a constant and $\gamma$ is a constant greater than 1.

18. A method according to claim 17 wherein $\gamma$ is at least 1.5 at a direct current stress between 0.01 KV/mm and 10 KV/mm.

19. A method according to claim 18 wherein $\gamma$ is at least 1.5 at a stress below 5 KV/mm.

20. A method according to claim 14 wherein the outer surface has an initial tracking voltage of at least 3.5 KV.

21. A method according to claim 14 wherein the outer surface is non-tracking.

22. A method according to claim 14 wherein the layer covers the entire inner surface of said sleeve.

23. A method according to claim 14 wherein the inner surface of said sleeve is coated at its ends with a sealant and intermediate its ends with said layer of stress grading electrical impedance character.

24. A method according to claim 23 wherein the sealant and stress grading layer together cover the entire inner surface of the sleeve.

25. A method according to claim 14 wherein the layer comprises a particulate electrically conductive filler dispersed in a polymer to the extent of at least 10 parts by weight per 100 parts by weight of the polymer.

26. A method according to claim 25 wherein the layer comprises carbon black.

27. An article as claimed in claim 1 wherein the layer comprises a thermoplastic material.

28. The article of claim 1 in which the layer comprises a gum form rubber.

29. The method of claim 14 in which the layer comprises a thermoplastic material.

30. The method of claim 14 in which the layer comprises a gum form rubber.

* * * * *